June 20, 1967 R. F. BERGDAHL 3,327,052

CHROMINANCE CHANNEL AMPLIFIER AND CONTROL CIRCUIT ARRANGEMENT

Filed Dec. 14, 1964 3 Sheets-Sheet 1

INVENTOR
ROBERT F. BERGDAHL
BY Frank J. Thompson
ATTORNEY

June 20, 1967 R. F. BERGDAHL 3,327,052

CHROMINANCE CHANNEL AMPLIFIER AND CONTROL CIRCUIT ARRANGEMENT

Filed Dec. 14, 1964 3 Sheets-Sheet 2

INVENTOR

ROBERT F. BERGDAHL

BY

ATTORNEY

INVENTOR
ROBERT F. BERGDAHL
BY Frank J. Thompson
ATTORNEY

United States Patent Office 3,327,052
Patented June 20, 1967

3,327,052
CHROMINANCE CHANNEL AMPLIFIER AND CONTROL CIRCUIT ARRANGEMENT

Robert F. Bergdahl, Emporium, Pa., assignor to Sylvania Electric Products Inc., a corporation of Delaware Filed Dec. 14, 1964, Ser. No. 418,107
5 Claims. (Cl. 178—5.4)

ABSTRACT OF THE DISCLOSURE

A single stage chrominance amplifier circuit for color television receiving apparatus utilizing a pentode vacuum tube. In addition to providing amplification of the chroma signal, the single stage is operative to accomplish the color-killer, the color burst subcarrier separation and the automatic chroma control functions at the suppressor screen and control grids, respectively, of the vacuum tube.

This invention relates to signal processing circuit arrangements for use in color television receiving apparatus and more particularly to a chrominance signal amplifier and control circuit arrangement.

Various control functions are performed in the chrominance section of a television receiving apparatus which is adapted for reproducing an image in color and in monochrome. These functions include the maintenance of a desired ratio between the amplitudes of luminance and chrominance components of a received composite signal during the reception of color intelligence and the disabling of a chrominance signal amplifier during the reception of monochrome information. As is well known, the maintenance of the luminance to chrominance signal amplitude ratio serves to establish saturation of the colors in the reproduced image at desired values while the disabling of the chrominance signal amplifier prevents color contamination of the reproduced image during monochrome reception. These functions are conveniently performed in television receiving apparatus utilizing two amplifier stages in the chrominance signal channel. Means including a phase detector establish an automatic chrominance control voltage, $E_{ACC}$, at a control electrode of an amplifying device in the first stage while a phase detector and amplifier establish a color-killer voltage, $E_{CK}$, at a control electrode of an amplifying device in the second stage.

It is desirable to reduce the number of components in the television receiving apparatus and consequently the attending cost of fabrication. Present-day amplifying devices generally provide amplification sufficiently large so as to render unnecessary the prior need for more than one stage of signal amplification in the chrominance signal channel. However, the elimination of one of the signal amplifier stages disposes of a circuit which formerly was also utilized in performing one of the referred-to control functions.

Single stage amplifier circuit arrangements have been proposed for accomplishing the automatic chrominance control and color-killer functions. These amplifiers are of the "self-killing" type, and although economical in the elimination of a "color-killer" amplifier stage as well as the chrominance signal amplifier stage, they are disadvantageous in several respects. In one form, "self-killing" undesirably requires the utilization of a relatively high D.C. impedance in the plate circuit of the chrominance signal amplifier in order to provide two ranges of gain control for different values of D.C. control voltages. In another form, feedback from a screen electrode to a suppressor electrode of a pentode chrominance signal amplifier disables the amplifier at low input signal levels. The latter arrangement responds more rapidly to impulses such as electrical noise than does a previously employed phase detector and color-killer amplifier arrangement and is therefore subject to sporadic operation in the presence of low level input signals. In both of these single stage amplifier arrangements, the "self-killing" function reduces the normal chrominance signal sensitivity of the stage. Although the use of an independent source of color-killer control voltage generally requires an additional amplifying device in present-day receiving apparatus, as compared with the "self-killing" arrangement, the reliable circuit operation and greater signal sensitivity accompanying such an arrangement at times recommends its use. It is therefore desirable to provide in a television receiving apparatus incorporating an independent source of color-killer voltage a single stage chrominance amplifier which is adapted to effect both the automatic chrominance control and color-killer functions.

Accordingly, it is an object of the present invention to provide in a television receiving apparatus adapted to reproduce images in color and in monochrome an improved circuit arrangement having a single stage chrominance amplifier.

Another object of the present invention is to provide in a television receiving apparatus adapted to reproduce images in color and in monochrome a circuit arrangement including sources of color-killing and automatic chrominance control voltages and having a single stage chrominance signal amplifier adapted to effect both the automatic chrominance and the color-killer control functions at the chrominance amplifier.

The demodulation of chrominance intelligence requires the separation of a synchronizing burst signal from the received composite video signal. In providing this function, a single stage chrominance amplifier of the referred-to "self-killing" type has been proposed wherein the chrominance intelligence is derived from the anode of a pentode device while the burst signal is derived from a screen electrode circuit. A gating pulse, which is coincident in time with the burst signal, is coupled to the anode for increasing the gain of the screen circuit to thereby effect burst separation. However, unless a pulse source of relatively low impedance is provided, the source is undesirably loaded down by the anode circuit of the device.

It is another object of the present invention to provide in a color television receiving apparatus a circuit arrangement including a single stage chrominance amplifier adapted for effecting the automatic chrominance control and color-killer functions and having improved means for extracting the burst signal from the composite signal at a screen electrode of a signal amplifying device.

A television receiving apparatus adapted for reproducing images in color and in monochrome and which is constructed in accordance with the present invention includes a circuit arrangement comprising a multielectrode, chrominance signal electron discharge amplifying device, a source of D.C. color-killer voltage, $E_{CK}$, a source of automatic chrominance control voltage, $E_{ACC}$, and a source of periodically recurring anode current inhibiting pulses. A first control electrode, a screen electrode, and a second control electrode are spaced between cathode and anode electrodes of the amplifying device. Circuit means apply a video signal having chrominance and burst components to the first control electrode and the periodically recurring pulses to the second control electrode. Circuit means also apply the D.C. color-killer voltage, $E_{CK}$, to one of the control electrodes and the D.C. automatic chrominance control voltage, $E_{ACC}$, to the other of the control electrodes. The anode electrode is coupled to a demodulation network while the screen electrode is coupled to a burst signal utility circuit. Through this arrangement, a single stage chrominance signal amplifier is provided wherein the automatic chrominance control function is effected at a first control electrode; the color-killer function and burst gating functions are provided at the second control electrode; and the burst signal is extracted from the screen electrode. The circuit, in addition to eliminating an amplifying stage, thereby provides stable operation and sensitivity at relatively low chrominance signal input levels and causes minimum loading on the pulse source.

These and other features of the present invention will become apparent with reference to the following specification and drawings in which.

Figure 1:
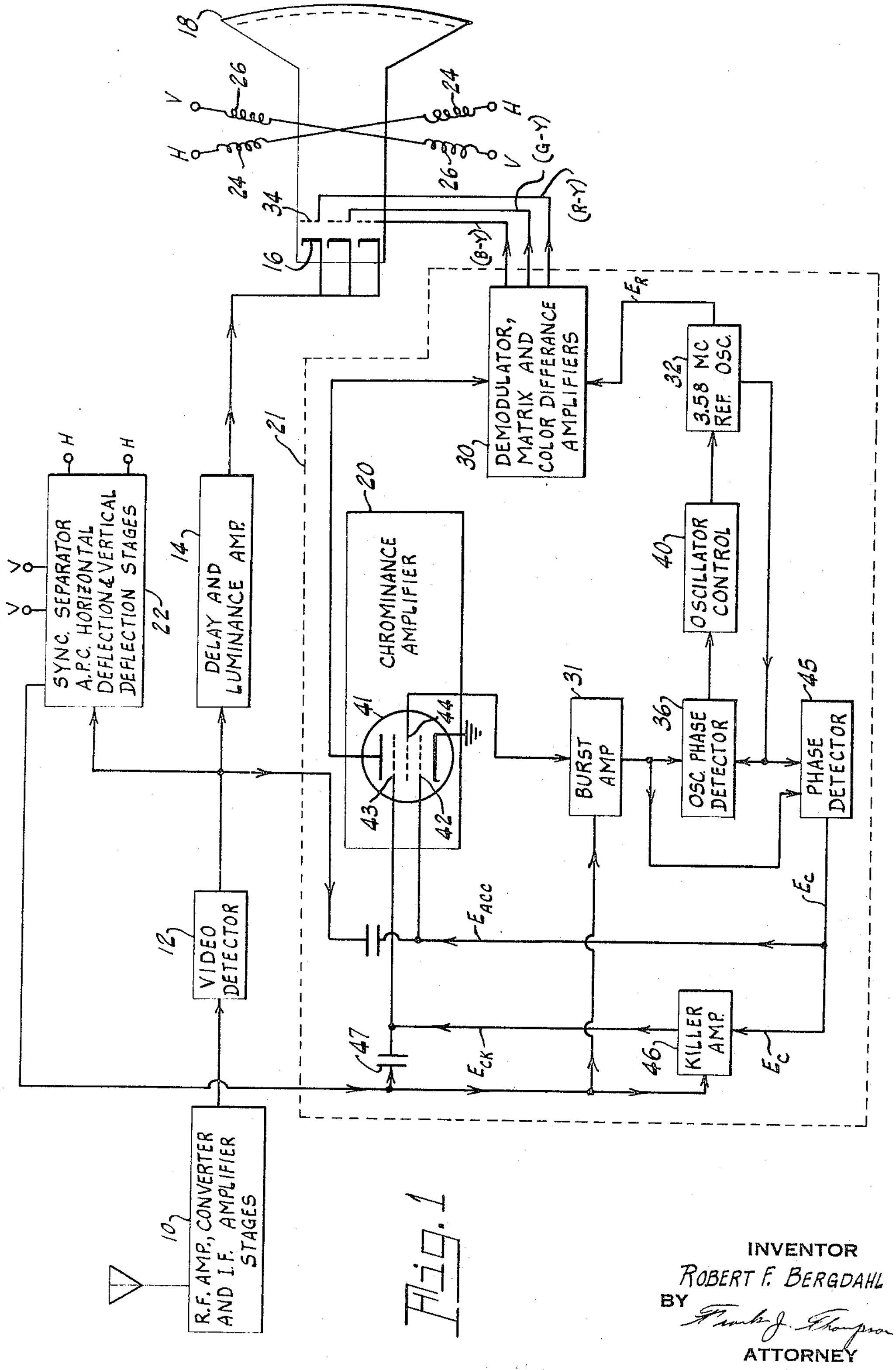
FIGURE 1 is a diagram, in block form, of a color television receiving apparatus utilizing an embodiment of the present invention.

Referring now to FIGURE 1, a television receiver adapted for reproducing images in color and in monochrome is shown. The receiver includes conventional circuit means, represented by the block 10, and comprising RF amplifier, converter, and intermediate frequency amplifier stages for respectively selecting and amplifying a broadcast signal for converting the signal to an intermediate frequency and for amplifying the intermediate frequency signal. The received signal includes modulation components comprising deflection synchronizing components and luminance components when a monochrome signal is being received and, in addition, chrominance video components and a synchronizing burst component signal of (3.58 mc.) subcarrier frequency when a chrominance signal is being received. The composite signal is detected by a video detector 12 and the luminance modulation component (Y), having a bandwidth of approximately 3.5 mc., is delayed and amplified by circuit means represented by the block 14. The amplified luminance output signal (Y) is applied to the cathode electrodes 16 of a picture tube 18 which is shown in FIGURE 1 to be of the well-known trigun shadow mask type. The detected composite signal is also applied to a chrominance bandpass amplifier 20, in a chrominance section 21 of the receiver, and which is adapted to pass signal components occupying the 2.5–4 mc. frequency range of chrominance intelligence. In addition, the composite detected signal is applied to synchronizing signal separator and electron beam deflection circuits of the receiver, represented by the block 22, for causing sawtooth deflection currents of approximately 15,750 c.p.s. and 60 c.p.s. to flow in the horizontal and vertical deflection windings 24 and 26, respectively. The deflection circuit 22 includes a source of gating pulses which occur periodically during the scanning retrace interval and are thus in time coincidence with the chrominance burst synchronizing signal. These pulses, which may be of a positive and negative polarity, are coupled via a line 27 to various stages in the chrominance section 21 of the receiver.

The chrominance section 21 of the receiver comprises those stages located within the dashed lines of FIGURE 1. Amplified chrominance intelligence is coupled from one output of the amplifier 20 to a chrominance demodulator, matrix, and color-difference signal amplifier stages indicated generally by the block 30 while amplified synchronizing burst signals are coupled from a second output of the amplifier 20 to a gated burst amplifier 31. A locally generated reference signal, $E_R$, of subcarrier frequency (3.58 mc.) is derived from a generator 32 which may comprise a crystal controlled oscillator. The reference signal, $E_R$, is coupled to the demodulator unit 30 for causing synchronous demodulation of the chrominance intelligence in a well-known manner. Two demodulated color difference signals are matrixed to provide a third color-difference signal, and these signals are amplified in the unit 30 and applied to control electrodes 34 of the picture tube 18.

For proper operation of the synchronous demodulator, it is required that the phase of the locally generated subcarrier reference signal, $E_R$, be synchronized with the subcarrier signal of the transmitter. To this end, a control circuit including a phase detector 36 and an oscillator control circuit 40 are provided. The phase detector 36 generates a D.C. voltage having an amplitude which is proportional to the phase difference between the input burst and subcarrier reference signals. This D.C. voltage is applied to the control circuit 40, which may be a reactance control circuit arrangement adapted for causing the phase of the reference oscillator signal to vary in accordance with the phase detector control voltage until synchronization is obtained.

The chrominance amplifier 20 comprises a single stage amplifier including an electron discharge amplifying device 41 shown symbolically in FIGURE 1 and having first and second control electrodes 42 and 43, respectively, and a screen electrode 44. A phase detector circuit 45 generates a D.C. control voltage, $E_C$, which is applied to the first control electrode 42 along the composite video signal. The amplitude of the voltage, $E_C$, varies inversely with variations in the amplitude of the synchronizing burst signal. The voltage at the electrode 42 thus comprises an automatic chrominance control voltage, $E_{ACC}$, and varies the gain of the chrominance amplifier 20 in a manner for maintaining the burst signal at a relatively constant amplitude during the reception of chrominance information. A source of killer voltage, $E_{CK}$, comprises the phase detector 45 and the killer amplifier 46. The control voltage, $E_C$, which is applied to the killer amplifier 46, is inverted during the amplifying process and an output D.C. color-killer voltage, $E_{CK}$, is coupled from the amplifier 46 to the second control electrode 43 of the amplifying device 41. In addition, a gating pulse, derived from the source 22, is also applied to the second control electrode via the capacitor 47. The color-killer voltage, $E_{CK}$, disables the chrominance output circuit in the absence of a synchronizing burst signal while the gating pulse functions to disable the chrominance output circuit only during a scanning retrace interval.

Figure 2:
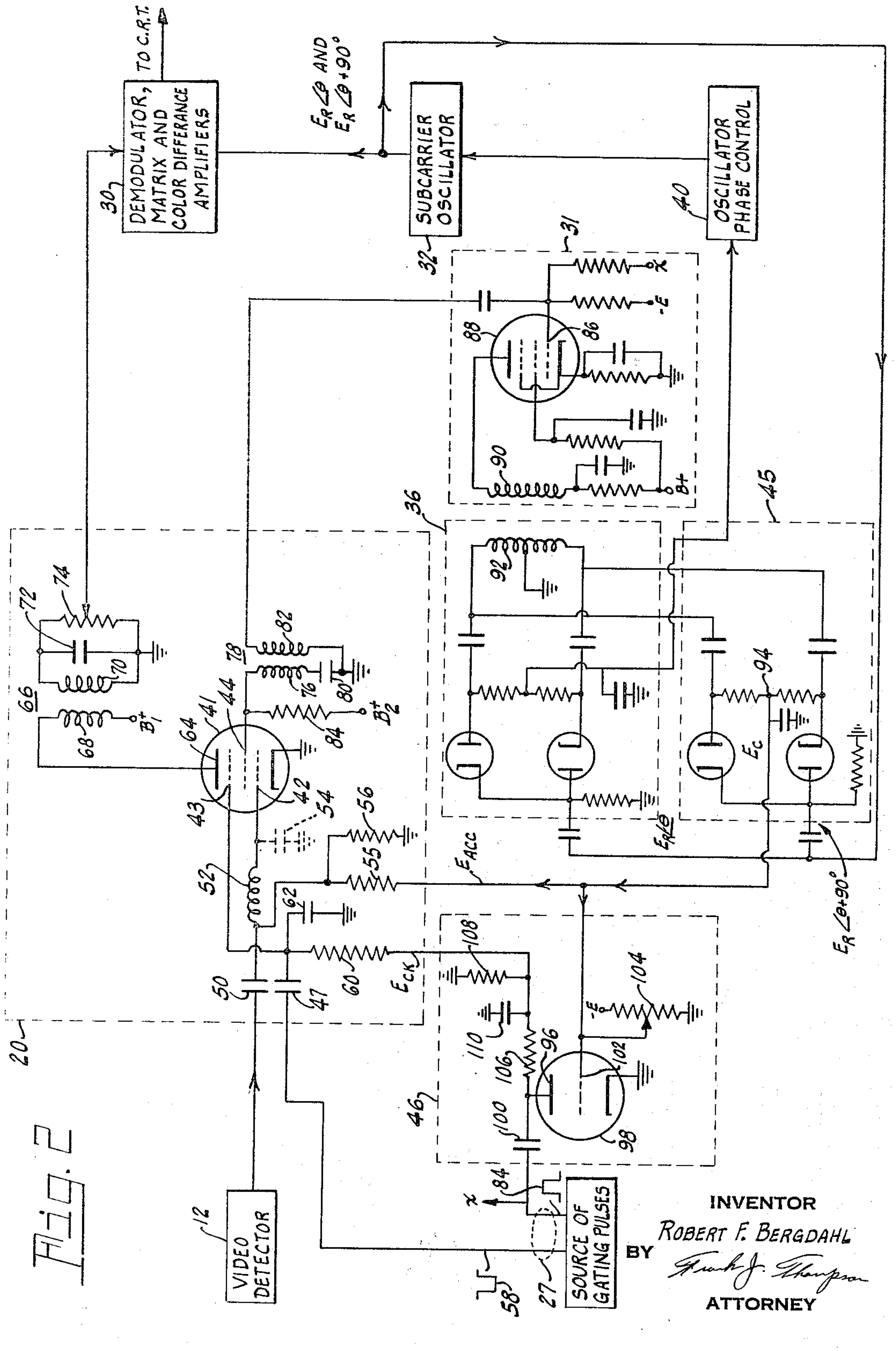
FIGURE 2 is a diagram, partly in block and partly in schematic form, illustrating a single stage chrominance amplifier and control circuit of the present invention.

A detailed description of the chrominance section 21 of the receiver is illustrated in FIGURE 2 wherein the schematic circuit equivalents of the functional blocks of FIGURE 1 are enclosed within dashed lines and are referred to by similar referenced numerals. The chrominance amplifier 20 includes a pentode electron discharge amplifying device 41 having a control electrode 42, a suppressor electrode 43 functioning as a second control electrode, and a screen electrode 44. A video signal, including chrominance intelligence and synchronizing burst components, is coupled to the control electrode 42 via a D.C. blocking capacitor 50 and an inductor 52, which in conjunction with distributed and stray capacitance 54, is broadly series resonant to the 2.5–4 mc. chrominance intelligence frequency band. A control voltage, $E_C$, which is generated by the phase detector 45, is also applied to the electrode 42 through a resistive voltage divider comprising resistors 55 and 56 and represents an automatic chrominance control voltage, $E_{ACC}$, at this electrode. A negative-going gating pulse 58, occurring during the scanning retrace interval and which may be derived from a winding on a horizontal output transformer in the deflection circuit 22, is applied to the suppressor electrode 43 via the capacitor 47. The color-killer voltage, $E_{CK}$, from the color-killer amplifier 46 is also applied to the suppressor electrode 43 via a resistor 60. A capacitor 62 bypasses the suppressor for chrominance intelligence frequency components. Amplified chrominance signal components appear across a load circuit which is coupled to an anode electrode 64. The load circuit comprises a transformer indicated generally as 66. Anode operating voltage is applied to the device 41 through a primary winding 68 while a secondary winding 70 is shunted by a capacitance 72 and a chrominance signal level potentiometer 74 which functions as a saturation control for the receiver. The transformer 66 is tuned for the desired bandpass characteristic by the capacitor 72. A load circuit for the screen electrode 44 includes a series resonant circuit comprising a primary winding 76 of a transformer, indicated generally as 78, and a capacitor 80. The resonant circuit is tuned to the subcarrier frequency of 3.58 mc. A synchronizing burst signal appears across the primary winding 78 and is coupled via a secondary winding 82 to a burst signal utilization circuit comprisng the burst sgnal amplifier 31. Direct-current operating voltage is applied to the screen electrode 44 by a screen dropping resistor 84.

The direct-current automatic chrominance control voltage, $E_{ACC}$, and color-killer voltage, $E_{CK}$, are established in a conventional manner. A gating pulse 84 is derived from a source 22 and is coupled to a control electrode 86 of the normally inhibited burst signal amplifying device 88. The burst signal, which occurs coincidentally in time and in amplified form at the screen electrode 44 of the chrominance amplifying device 41, is applied to the control electrode 86 of the burst amplifier. A further amplified burst output signal appears across a primary winding 90 of a burst amplifier load transformer and is coupled via a secondary winding 92, both to the oscillator phase detector 36 and to the phase detector 45. A quadrature delayed subcarrier signal, $E_R\angle\theta+90°$, is also applied to the phase detector 45. This phase detector is shown to be of the well-known balanced diode type. Since the subcarrier reference signal in quadrature related and delayed in phase with respect to the burst signal at the phase detector 45, a negative D.C. control voltage, $E_C$, appears at the phantom ground point 94. The amplitude of the locally generated subcarrier signal, $E_R$, is substantially constant whereas the burst signal and, accordingly, the chrominance signal may be undesirably subjected to amplitude variations. As is well known, the phase detector 45 generates a corresponding variation in the magnitude of the negative voltage, $E_C$, at the point 94 when variations in burst signal amplitude occur. As the burst signal decreases in amplitude, the nominal negative voltage of $E_C$ becomes less negative and, as the amplitude of the burst signal increases, this negative voltage, $E_C$, becomes more negative with respect to its nominal value. The voltage, $E_C$, thus varies with respect to a variation in the amplitude of the burst signal and is therefore suitable for functioning as an automatic chrominance control voltage, $E_{ACC}$, and for effecting control of the gain of the stage 20 at the control electrode 42.

The color-killer amplifier 46 is a conventional anode-keyed amplifier which derives an anode pulse voltage from the source 22. The pulse 84 is coupled to an anode 96 of the amplifying device 98 via a capacitor 100 while the control voltage, $E_C$, is coupled to a control electrode 102 thereof. The absence of a burst signal indicates reception of a monochrome television signal and the voltage, $E_C$, will then attain its least negative value. A bias level setting potentiometer 104 is adjusted for providing that in the absence of burst and during occurrence of the pulse 84 the device 98 conducts anode current. An electrostatic charge is thereby established on the capacitor 100 during the retrace interval. During the trace interval, the device 98 is cut off and the charged capacitor 100 causes a current to flow in the circuit comprising resistors 106 and 108 and to establish a voltage at the junction of these resistors which is sufficiently negative for inhibiting anode current in the chrominance amplifying device 41. The capacitor 110 functions as a filter capacitor for this negative voltage source. During the reception of chrominance intelligence, the burst signal is present and the negative voltage created thereby maintains the device 98 in a state of anode current cutoff. Therefore, the suppressor electrode 43 is effectively at ground potential and anode current is free to flow in a chrominance amplifying device 41 throughout the scanning trace interval.

By virtue of the described circuit arrangement, the chrominance amplifier 20 has different modes of operation during the reception of chrominance and monochrome signals. When chrominance information is being received, anode current is cut off during a scanning retrace interval by the negative pulse 58 at the suppressor electrode 43. The anode output circuit of the chrominance amplifier is thereby inhibited while the gain in the screen electrode circuit is increased. Since the burst signal occurs in time coincidence with the pulse 58, an amplified burst signal is generated in the screen circuit and is coupled to the burst amplifier 31. As indicated above, this burst signal functions to generate a negative control voltage. During the scanning trace interval, the amplifier 20 is enabled and an amplifier chrominance intelligence signal is coupled to the demodulation network 30. For monochrome reception, the burst signal is absent and the anode output circuit is inhibited throughout both the scanning trace and retrace intervals by the color-killer voltage. However, the screen circuit remains enabled and is primed to "unkill" the color-killer bias when transmission of a color burst signal is reinitiated.

Figure 3:
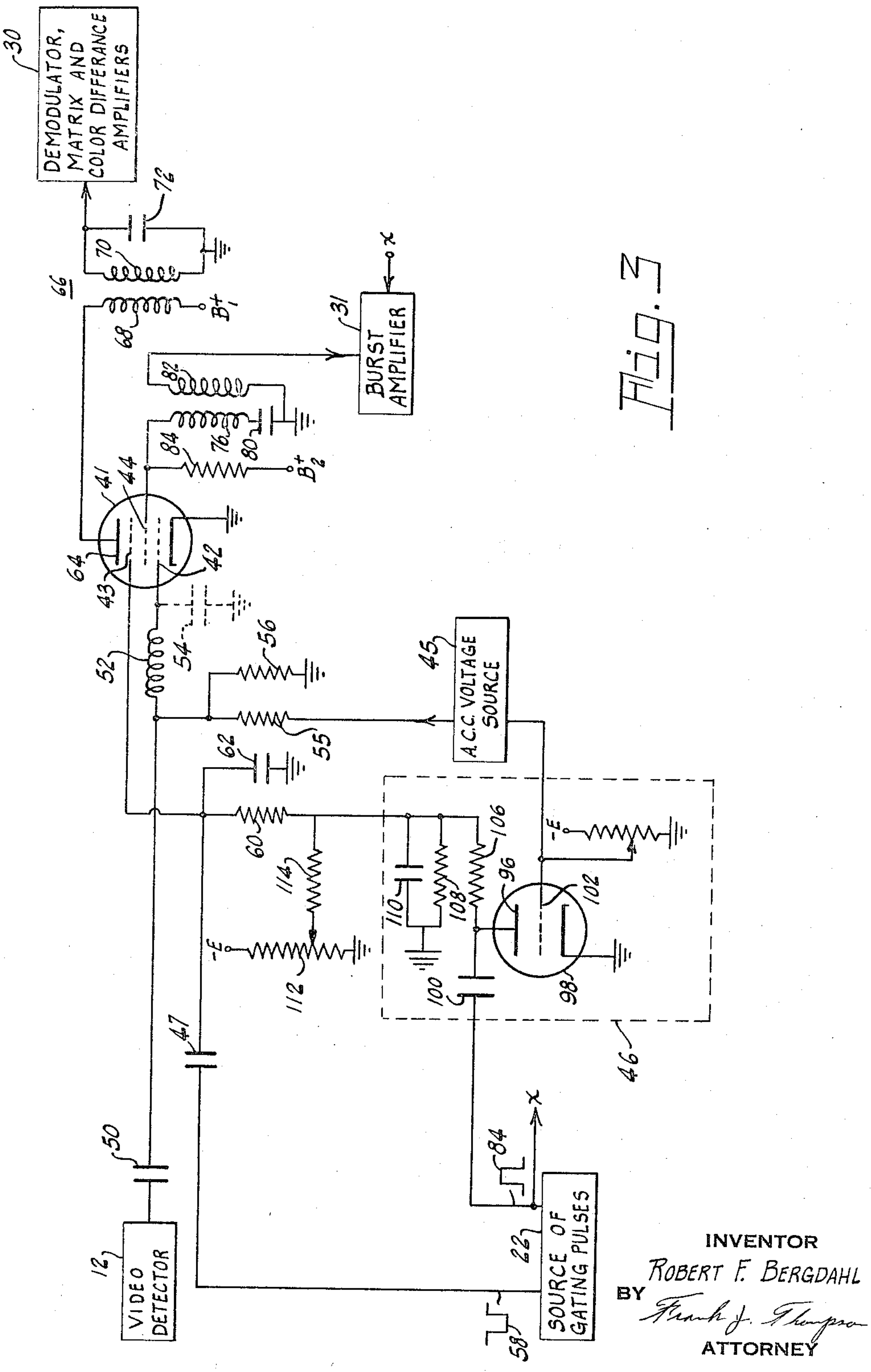
FIGURE 3 is a diagram, partly in block and partly in schematic form, illustrating an alternative embodiment of the circuit arrangement of the present invention.

In the alternative embodiment of the invention illustrated in FIGURE 3, a chrominance signal amplitude control for providing saturation control of the reproduced image is accomplished by varying the bias on the suppressor electrode 43 rather than deriving the chrominance signal from an adjustable tap on a potentiometer in an output circuit of the chrominance amplifier. Components of the arrangement of FIGURE 3, which perform functions similar to the functions performed by components of FIGURE 2, are indicated by similar reference numerals. A potentiometer 112 is connected to a source of bias voltage. A variable tap on the potentiometer 112 is connected to the suppressor electrode 43 via an isolation resistor 114 and the resistor 60. During the reception of chrominance intelligence, the tap may be adjusted to provide different bias voltages at the electrode 43 and therefore functions to adjust the gain of the stage. The color-killer circuit 46 is inoperative at this time, but during the reception of monochrome information, a color-killer voltage, $E_{CK}$, overrides this manually adjustable bias voltage and maintains the device 41 in a state of anode current cutoff.

The following component values for the chrominance amplifier 20 of FIGURES 2 and 3 are given by way of example and are not limiting in any respect:

| | | |
|---|---|---|
| Capacitor: | | |
| **47** | μf | .01 |
| **50** | μf | .001 |
| **62** | μf | .0001 |
| **72** | μf | 330 |
| **80** | μf | .0003 |
| **110** | μf | .05 |
| Inductor | | |
| **52** | 90 μh | 5.0Ω |
| Transformer: | | |
| **66** | | (1) |
| **78** | | (2) |

[1] $68_{Pri}$=240 μh, 9.5Ω; 70 $_{Sec}$=4 μh, 1.4Ω; $L_m$=20.
[2] $82_{Sec}$=70 μh, 2.5Ω; $76_{Pri}$=4.5 μh, 0.2Ω; $L_m$=5.5.

| | | |
|---|---|---|
| Resistor: | | |
| **55** | | 100KΩ |
| **56** | | 100KΩ |
| **60** | meg. Ω | 1 |
| **74** | | 500Ω |
| **84** | | 5KΩ |
| Operating voltage | | |
| $B_1$+ | v. D.C. | 300 |
| $B_2$+ | v. D.C. | 100 |
| Amplifying device **50**. | | |
| Electron tube | Type | 9KC6 |

While there has been shown and described what is presently considered preferred embodiments of the invention, it will be obvious to those skilled in the art that various changes and modifications may be made therein without departing from the invention as defined by the appended claims.

What is claimed is:

1. In a television receiving apparatus adapted to reproduce images in color and monochrome, a chrominance amplifier and control circuit arrangement comprising:
- a single stage chrominance signal amplifier including an electron discharge amplifying device having control, screen, suppessor and anode electrodes;
- means for receiving and applying signals having chrominance intelligence and synchronizing burst components to said control electrode;
- a chrominance signal demodulation network;
- means for coupling an amplified chrominance signal from said anode electrode to said demodulation network;
- a burst signal utilization network;
- means for coupling burst signal components from said screen electrode to said burst signal utilization network;
- means for applying periodically recurring pulses occurring in time coincidence with said burst signal components to said suppressor electrode to thereby prevent anode current in said electron discharge amlifying device for the duration of each of said periodically recurring pulses;
- a color-killer amplifier;
- means for coupling a direct-current voltage from an output electrode of said color-killer amplifier to the suppressor electrode of said electron discharge amplifying device, said direct-current voltage operative to prevent anode current in said amplifying device in the absence of chrominance intelligence signal components; and
- means for applying a direct-current automatic chrominace control voltage to said control electrode.

2. The invention according to claim 1 additionally comprising manually adjustable circuit means coupled to said suppressor electrode and adapted for providing an adjustable direct-current voltage at said suppressor electrode.

3. The invention according to claim 1 wherein said burst signal utilization network includes a burst signal amplifier and additionally comprises:
- a network including a subcarrier reference signal generator and synchronizing network including a balanced-diode phase detector;
- means for coupling the output of said burst signal amplifier to said network; and
- means for coupling a direct-current voltage from said phase detector to an input of said color-killer amplifier.

4. The invention according to claim 3 wherein said means for applying a direct-current automatic chrominance control voltage to said control electrode comprises means for coupling a direct-current control voltage from said phase detector to said control electrode.

5. In a television receiving apparatus adapted to reproduce images in color and monochrome, a chrominance amplifier and control circuit arrangement comprising:
- a single stage chrominance signal amplifier including an electrone discharge amplifying device having control, screen, suppressor and anode electrodes;
- means for receiving and applying signals having chrominance intelligence and synchronizing burst components to said control electrode;
- a chrominance signal demodulation network;
- means for coupling an amplified chrominance signal from said anode electrode to said demodulation network;
- means for applying periodically recurring pulses occurring in time coincidence with said burst signal components to said suppressor electrode;
- a burst signal amplifier having input and output terminals;
- means for coupling burst signal components from said screen electrode to an input terminal of said burst signal amplifier;
- an oscillator network including a subcarrier oscillator and oscillator phase control circuitry;
- first and second balanced diode phase detector circuits;
- means for coupling the output from said burst signal amplifier to said first and second balanced diode phase detector circuits;
- means for coupling an output from said oscillator network to said first and second balanced diode phase detector circuits;
- means for coupling the output of said first balanced diode phase detector circuit to an input of said oscillator network;
- a color-killer amplifier;
- means for coupling a direct-current voltage from said second balanced diode phase detector circuit to an input electrode of said color-killer amplifier and to the control electrode of said electron discharge amplifying device; and
- means for coupling a direct-current voltage from an output electrode of said color-killer amplifier to the suppressor electrode of said electron discharge amplifying device.

References Cited

UNITED STATES PATENTS

| | | | |
|---|---|---|---|
| 2,894,059 | 7/1959 | Davis | 178—5.4 |
| 2,921,122 | 1/1960 | Macovski | 178—5.4 |
| 2,954,425 | 9/1960 | Richman | 178—5.4 |
| 2,971,050 | 2/1961 | Kelly et al. | 178—5.4 |
| 3,135,826 | 6/1964 | Moles et al. | 178—5.4 |
| 3,270,127 | 8/1966 | Hansen | 178—5.4 |

JOHN W. CALDWELL, *Acting Primary Examiner.*

J. A. O'BRIEN, *Assistant Examiner.*